United States Patent
Gamble

[11] Patent Number: 5,811,802
[45] Date of Patent: Sep. 22, 1998

[54] SCANNING PROBE MICROSCOPE WITH HOLLOW PIVOT ASSEMBLY

[76] Inventor: Ronald C. Gamble, 3390 Ellington Villa, Altadena, Calif. 91001

[21] Appl. No.: 720,243

[22] Filed: Sep. 26, 1996

Related U.S. Application Data

[63] Continuation-in-part of Ser. No. 516,771, Aug. 18, 1995, abandoned.

[51] Int. Cl.$^6$ ................................................. H01J 37/00
[52] U.S. Cl. ......................................... 250/306; 250/307
[58] Field of Search .................................. 250/306, 307; 73/105

[56] References Cited

U.S. PATENT DOCUMENTS

| | | | |
|---|---|---|---|
| 5,291,775 | 3/1994 | Bamble et al. | 73/105 |
| 5,294,804 | 3/1994 | Kajimura | 250/306 |
| 5,298,975 | 3/1994 | Khoury et al. | 250/306 |
| 5,319,960 | 6/1994 | Gamble et al. | 73/105 |
| 5,406,832 | 4/1995 | Gamble et al. | 250/306 |
| 5,406,833 | 4/1995 | Yamamoto | 73/105 |
| 5,408,094 | 4/1995 | Kajimura | 250/306 |
| 5,440,920 | 8/1995 | Jung et al. | 250/306 |
| 5,467,642 | 11/1995 | Hosaka et al. | 250/306 |
| 5,508,517 | 4/1996 | Onuki et al. | 250/306 |
| 5,616,916 | 4/1997 | Handa et al. | 250/306 |
| 5,675,154 | 10/1997 | Lindsay et al. | 250/306 |

*Primary Examiner*—Bruce Anderson
*Attorney, Agent, or Firm*—McCutchen, Doyle, Brown & Enersen

[57] ABSTRACT

A scanning probe microscope is disclosed which includes a pivotally mounted scanning assembly for scanning a surface of a sample. A sensing assembly is mounted relative to the scanning assembly and is positioned for sensing the surface topography of the sample. The scanning assembly includes a bore extending vertically through the scanning assembly which allows direct overhead viewing of the sensing assembly and the sample. The scanning assembly is pivotally mounted by a hollow pivot assembly which permits both the sensing assembly and the sample to be viewed through the scanning assembly when aligning the sensing assembly with the sample. The hollow pivot assembly also allows a user to optically view the sample from directly overhead with an optical microscope or charge coupled device.

27 Claims, 7 Drawing Sheets

SCANNING PROBE MICROSCOPE WITH HOLLOW PIVOT ASSEMBLY

RELATED APPLICATION

This application is a continuation-in-part of application ser. No. 08/516,771, filed Aug. 18, 1995, entitled SCANNING FORCE MICROSCOPE WITH INTEGRAL LASER-SCANNER CANTILEVER AND INDEPENDENT STATIONARY DETECTOR now abandoned.

FIELD OF THE INVENTION

This invention relates generally to scanning probe microscopes, and more particularly pertains to such microscopes with a hollow pivot assembly permitting direct overhead viewing of a sample and sensing means when the sensing means is positioned proximal to the surface of the sample.

BACKGROUND OF THE INVENTION

Scanning probe microscopy (SPM) represents a family of related techniques, useful for imaging objects as small as atoms, which operate by scanning a fine probe tip over a surface in order to generate a high-magnification ($\times 10^4$–$10^9$) three-dimensional image. A rastered scan of the probe is obtained by use of X-Y drivers, such as piezoelectric ceramics, which are capable of controlling probe motions with sub-angstrom resolution up to millimeter scan ranges. Probe-sample interactions are detected while scanning in the x-y plane; the probe signal is fed into a feedback loop which, in turn, controls the probe-sample separation in the z-direction. SPM can be used under air, liquid or vacuum conditions.

Some of the techniques included in SPM are:

Scanning force microscopy (SFM, also known as atomic force microscopy, AFM): a cantilever probe (e.g., an oscillating or non-oscillating horizontal cantilever with vertical tip, or an oscillating vertical cantilever with vertical tip) senses local attractive and repulsive forces at the surface. During imaging, suitable electronics are used to guide the probe tip over the surface in order to maintain a constant interactive force between the tip and the surface. The resultant signal data, therefore, represent some aspects of the surface topology.

Lateral force microscopy (LFM): plots the frictional response between the cantilever probe and sample.

Modulated force microscopy: maps the variation in sample compliance, or "hardness" caused by the amplitude of flexure of the cantilever.

Electrostatic force microscopy (EFM): measures the local electrostatic interaction between the tip and sample.

Magnetic force microscopy (MFM): measures the local magnetic attraction or repulsion between a magnetized tip and sample.

Force mapping (Layered Imaging): a force-distance curve is collected at each pixel location in the x-y raster scan and presented as a stack of "layered" images in the x-direction.

Scanning thermal microscopy (SthM): a probe which has a thermally-sensitive probe is used to map thermal conductivity or temperature variations between tip and sample.

Near-field scanning optical microscopy (NSOM): A small optical probe senses small changes in the light interacting with the surface (transmission, scattering, or fluorescence).

A typical scanning probe microscope includes a sensor which detects the surface contours of a sample. The sensor includes a cantilever arm having a probe tip positioned proximal to or in contact with the surface of a sample. As the sample moves relative to the cantilever arm, the probe tip interacts with the surface or surface forces of the sample which causes the cantilever arm to bend. To detect the bending of the cantilever arm, a laser beam is directed onto the cantilever arm. The laser beam is reflected by the cantilever arm onto a photodetector which generates a signal corresponding to the deflection of the cantilever arm. As the cantilever arm scans the sample, the sensor detects the topography of the sample.

To scan the surface of the sample, a scanner can either move the sample relative to a fixed sensor, or alternatively, move the sensor over the surface of a fixed sample. The first type of design which moves the sample is useful only for samples which are comparatively small or which are cut small enough from a larger specimen to be secured to the sample stage of the microscope. Moreover, to accommodate relatively high scan rates without causing distortion due to resonance effects, the samples also must weigh about a gram or less. As a result, this scanning force microscope design cannot be used with large or relatively heavy samples.

An example of the first type of scanning force microscope is described in U.S. Pat. No. 5,157,251. This patent describes a scanning force microscope having a movable specimen holder housed in a base and positioned relative to a probe housed in a fixed sensor head. Because the scanner is fixed while the specimen is moved, the microscope can scan only specimens which are small enough to fit within the specimen holder and which are light enough to be moved by the scanner.

The second type of design which moves the sensor instead of the sample overcomes these problems regarding the size and weight of the sample. In positioning the sensor on or proximal to the sample, however, the probe tip can be accidentally damaged by abrupt contact with the sample. As a result, the user must carefully position the probe tip relative to the sample. In this design, however, the user typically cannot view the approach of the lever arm and probe assembly to the surface of the sample to insure precise positioning of the probe. Even where an optical microscope is used to view the sample at an angle, the arrangement of the optical microscope with the scanning force microscope can be inconvenient and clumsy, and can interfere with the operation of the scanning force microscope. Moreover, these microscope designs do not allow a user to optically view the sample from directly overhead with an optical microscope or charge coupled device. Direct overhead viewing of the sample allows an individual to precisely align the sensor with a desired portion of the sample to be scanned.

For example, U.S. Pat. No. 5,291,775 describes a scanning force microscope which includes integrated optics for viewing the optical lever arm, probe and sample. The specimen, however, is not easily viewed by the unaided eye when the scanning force microscope is in the scanning position. Even with an optical microscope, a user can view the specimen only at a maximum angle of 45 degrees.

Similarly, U.S. Pat. No. 5,319,960 describes a sensor module for scanning force microscope designs which uses integrated scanning drivers to allow the examination of varying sizes and weights of specimen. As before, however, direct overhead viewing of the specimen is not possible while the microscope is in the scanning position and viewing of the specimen with an optical microscope is only possible up to a 45 degree angle.

U.S. Pat. No. 5,406,833 describes a scanning force microscope including a spring element with a detecting tip. This patent also does not allow a user to view the sensor from overhead or even at a high angle, although viewing at approximately 45 degrees may be possible.

Accordingly, there is a continuing need for a scanning probe microscope which is capable of scanning a stationary sample and allows a user to view the sensor and sample from directly overhead during scanning. In this respect, the present invention substantially fulfills this need.

SUMMARY OF THE INVENTION

It is an object of the present invention to provide a scanning probe microscope which moves the sensor assembly relative to a stationary sample.

It is another object of the present invention to provide a scanning probe microscope including a pivotally mounted scanning assembly which pivots about a stationary center point.

It is another object of the present invention to provide a scanning probe microscope which permits direct overhead viewing of the sensor when positioned proximal to a sample.

To accomplish these and other objects, the present invention provides a scanning probe microscope which includes a pivotally mounted scanning assembly for scanning a surface of a sample. A sensing assembly is mounted relative to the scanning assembly and is positioned for sensing the surface topography of the sample. The scanning assembly includes a bore extending vertically through the scanning assembly which allows direct overhead viewing of the sensing assembly and the sample. The scanning assembly is pivotally mounted by a hollow pivot assembly which permits both the sensing assembly and the sample to be viewed through the scanning assembly when aligning the sensing assembly with the sample.

These and other objects and advantages of the invention will become apparent from the following detailed description, and the accompanying drawings, which illustrate by way of example the features of the invention.

DESCRIPTION OF THE PREFERRED EMBODIMENTS

Figure 1:
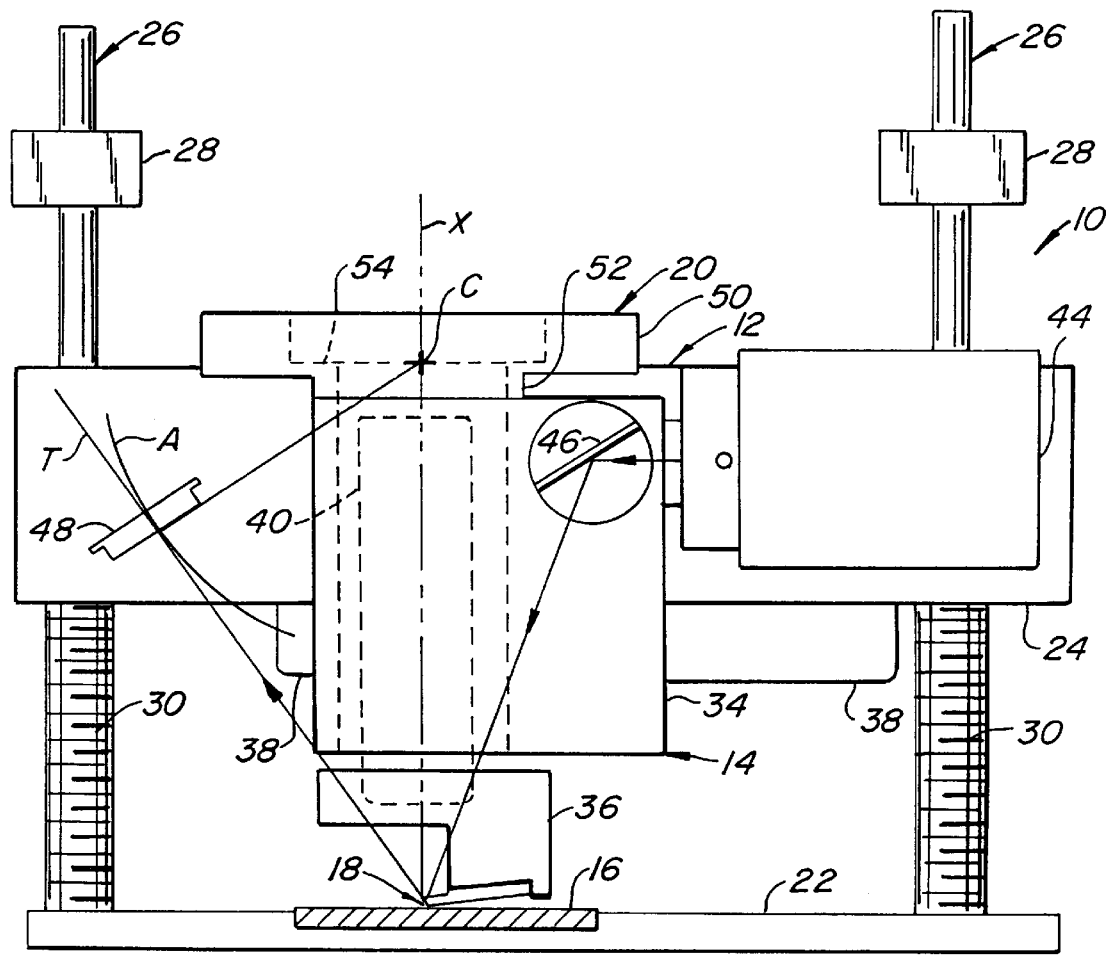
FIG. 1 is a front elevational view of a scanning probe microscope of the present invention.

As shown in FIG. 1, the present invention is embodied in a scanning probe microscope 10 including a support structure 12 that supports the elements of the present invention. The support structure 12 includes a lower base 22 which can support a sample 16. A scanning assembly 14 is pivotally mounted relative to the support structure 12 for scanning a surface of the sample 16. A sensing assembly 18 is mounted relative to the scanning assembly 14 and is positioned for sensing the surface topography of the sample 16. The scanning assembly 14 includes a bore (not labeled) extending vertically through the scanning assembly which allows direct overhead viewing of the sensing assembly 18 and the sample 16. To pivotally mount the scanning assembly 14 relative to the support structure 12 without obstructing this view, a hollow pivot assembly 20 extends between the scanning assembly and the support structure. The hollow pivot assembly 20 allows both the sensing assembly 18 and the sample 16 to be viewed through the scanning assembly 14 when aligning the sensing assembly with the sample.

As shown in FIG. 1, the support structure 12 includes the lower base 22 positionable upon a support surface. Alternatively, the lower base 22 may form a larger portion of the sample 16. A main body 24 is movably supported relative to the lower base 22 by adjustable motor driven supports 26. The adjustable motor driven supports 26 operate to position the main body above the lower base and to move the main body in a vertical direction relative to the specimen 16. Each of the motor driven supports 26 includes an optically encoded screw drive motor 28 which drives a screw 30 extending between the lower base 22 and the main body 24. The screw drive motors 28 are connected to a control unit (not shown) which coordinates the operation of the supports 26 to uniformly raise and lower the main body. Preferably, the support structure 12 includes three adjustable motor driven supports 26 arranged in a tripod which cooperatively support the main body 24 relative to the lower base 22, although any desired number of supports 26 may be used.

As also shown in FIG. 1, the scanning assembly 14 includes an upper scanner body 34 pivotally mounted relative to the main body 24 of the support structure 12. A lower scanner body 36 is mounted beneath the upper scanner body 34 and supports the sensing assembly 18 proximal to the lower base 22. To raster scan the sensing assembly 18 relative to the sample 16, the scanning assembly 14 includes X-Y motion drivers, preferably stacked X-Y piezo drivers 38 coupled between the upper scanner body 34 and the main body 24 of the support structure 12. A motion driver is an element "A" which, when inserted or attached between two other elements "B" and "C", is capable of increasing or decreasing the distance between elements B and C by electrical or magnetic actuation. The X-Y piezo drivers 38 are oriented at right angles to each other for X and Y raster scanning movements. Preferably, the X-Y piezo drivers 38 extend from opposed sides of the upper scanner body 34 in each direction to rigidly support and articulate the upper scanner body relative to the main body 24.

To move the sensing assembly 18 relative to the sample 16 in the vertical or Z direction, the scanning assembly 14 includes a motion driver in the Z direction, preferably at least one stacked Z piezo driver 40 mounted between the upper scanner body 34 and the lower scanner body 36. Preferably, a spaced pair of Z piezo drivers 38 extend from opposed sides of the upper scanner body 34 to opposed sides of the lower scanner body 36 to rigidly support the lower scanner body. The Z piezo drivers 44 are coupled to a feedback control means (not shown) for driving each Z piezo driver in the vertical dimension as the sensing assembly 18 traverses the contours of the specimen 16 to maintain a substantially constant interaction force between the sensing assembly and the specimen 16. The feedback control means can also be connected to the screw drive motors 28 of the motor driven supports 26 to enable the control means to uniformly coordinate the operation of the drive motors 28 in raising and lowering the main body 24 of the microscope 10. In this manner, the scanning assembly 14 can maintain a constant distance between the sensing assembly 18 and the surface of the sample 16.

Figure 2:
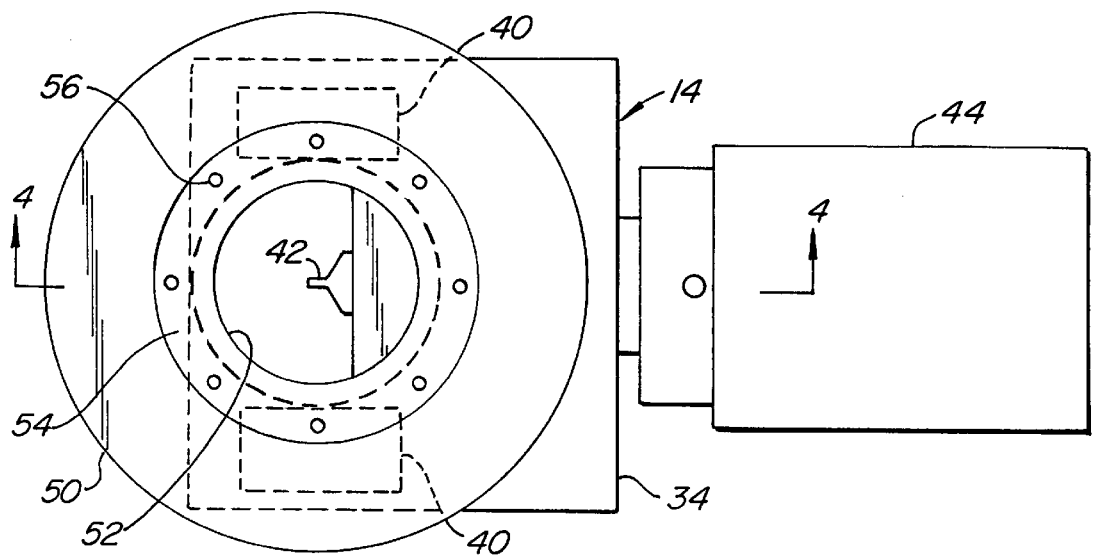
FIG. 2 is a top plan view of a portion of the invention illustrating the hollow pivot assembly.
Figure 3:
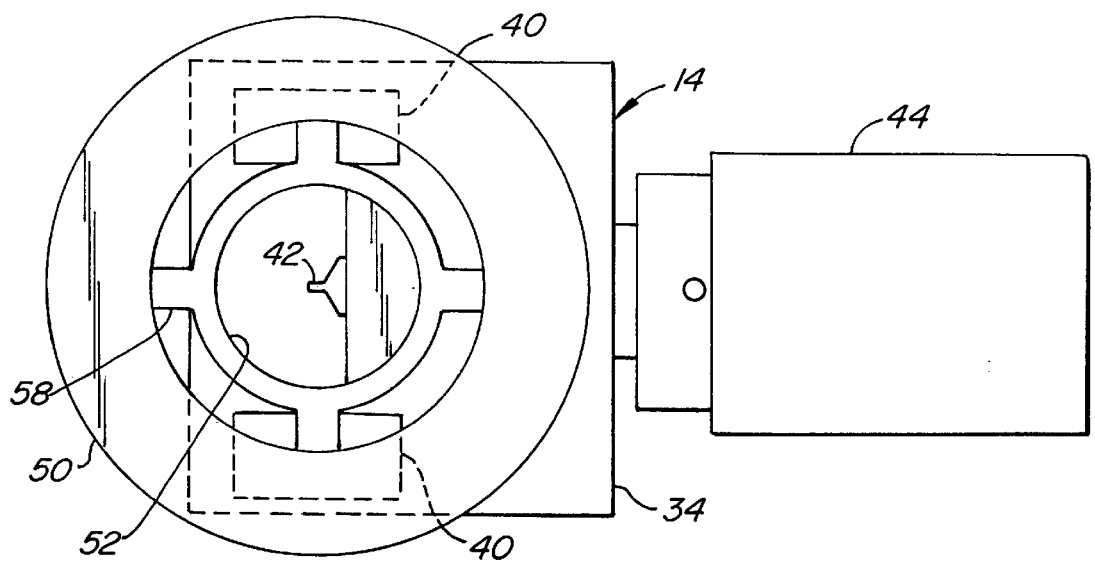
FIG. 3 is a top plan view of an alternative form of the hollow pivot assembly.

The sensing assembly 18, as shown in FIGS. 1 through 3, comprises a reflective cantilever arm 42 coupled relative to the lower scanner body 36. Attached to the free end of the cantilever arm 42 is a probe tip (not labeled) adapted to contact and follow the surface contours of the specimen 16. A light source 44, such as a laser diode with associated optics, is mounted relative to the upper scanner body 34. The light source 44 produces a focused light beam which is directed toward the cantilever arm 42 by a mirror 46. The cantilever arm 42 receives the light beam and reflects it toward a photodetector 48.

The photodetector 48 is mounted relative to the main body 24 of the support structure 12. The photodetector 48 generates an electrical output signal in response to the deflected light beam. The output signal is indicative of the degree of deflection of the cantilever arm 42. The photodetector 48 is mounted at the light beam's tangent T to an arc A that is swept about a center point C of the upper end of the bore extending through the upper scanner body 34. This position of the photodetector 48 assures that the light beam strikes the photodetector at the same angle regardless of the position of the scanning assembly 14. As a result, the position of the photodetector 48 reduces signal errors from movement of the scanning assembly 14.

Alternatively, in some circumstances, such as when a closed environment is needed for the entire scanning assembly 14 relative to sample 16, the photodetector 48 can be mounted directly onto the upper scanner body 34. In this case, the detector may be positioned at any convenient position intersecting the path of the deflected light beam. This provides for greater flexibility in designing an environmental enclosure, when the need arises.

As shown in FIG. 1, the bore extending vertically through the scanning assembly 14 comprises an upper scanner body bore (not labeled) extending through the upper scanner body 34 which allows direct overhead viewing of the sensing assembly 18 and the sample 16. By direct overhead viewing is meant that an individual can view the cantilever arm 42 and the sample along an axis X directed through the cantilever arm and perpendicularly intersecting the sample 16. Such direct overhead viewing through the upper scanner body bore allows an individual to view both the sensing assembly 18 and the sample 16 through the scanning assembly 14 when aligning the sensing assembly with the sample. This allows the sensing assembly 18 to be positioned in close proximity to the sample 16 without damaging the sensing assembly by unintentionally impacting it against the sample. This also allows the sensing assembly 18 to be positioned onto a desired portion of the sample 16 to be scanned.

Figure 4:
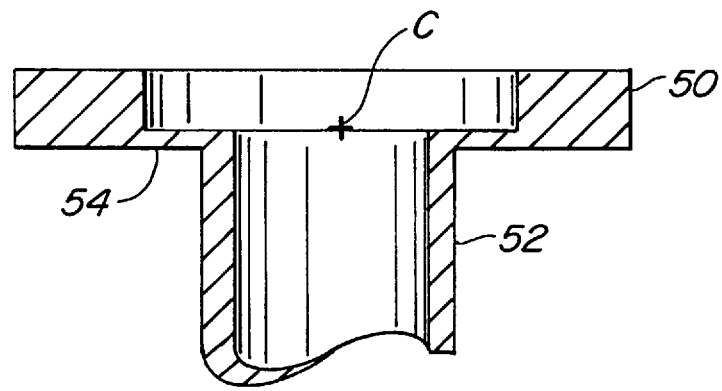
FIG. 4 is a cross sectional view taken along line 4—4 of FIG. 2.

To permit the scanning assembly 14 to articulate about the center point C while also permitting an individual to view both the sensing assembly 18 and the sample 16 through the bore in the scanning assembly along the axis X, the hollow pivot assembly 20 comprises a mounting portion 50 which is secured relative to the main body 24 of the support structure 12. The mounting portion 50 is shaped to define a mounting portion bore (not labeled) extending through the mounting portion which is aligned with the upper scanner body bore. A neck portion 52 is integral with or coupled to the upper scanner body 34 and extends at least partially about the upper scanner body bore. The neck portion 52 is pivotally coupled to the mounting portion 50 such that the neck portion 50 can pivot relative to the mounting portion 52 about the center point C, as shown in FIGS. 3 and 4. In this manner, the scanning assembly can pivot about the center point C and an individual can view the sensing assembly 18 and sample 16 from directly overhead.

To pivotally couple the neck portion 52 to the mounting portion 50, a flexible material can extend between the neck portion and the mounting portion. This flexible material can be metal, plastic, or any other material capable of resiliently deforming. As shown in FIG. 2, the flexible material may be shaped as a flexible diaphragm 54 which extends between the neck portion 52 and the mounting portion 50. Preferably, the flexible diaphragm 54 extends substantially perpendicularly from the neck portion 52, as shown in FIG. 4. If desired, the flexible diaphragm 54 may be shaped to define a series of holes 56, as shown in FIG. 2, which reduce the force needed to pivot the neck portion 52 relative to the mounting portion 50. If the flexible diaphragm 54 includes the holes 56, they are preferably symmetrically spaced about the flexible diaphragm so that the force needed to deform the diaphragm is equal about all sides of the neck portion 52. As shown in FIG. 3, the flexible material may alternatively be shaped as one or more tabs 58 extending between the neck portion 52 and the mounting portion 50. The tabs 58 are preferably symmetrically spaced about the flexible diaphragm so that the force needed to deform the tabs 58 is equal about all sides of the neck portion 52.

Figure 5:
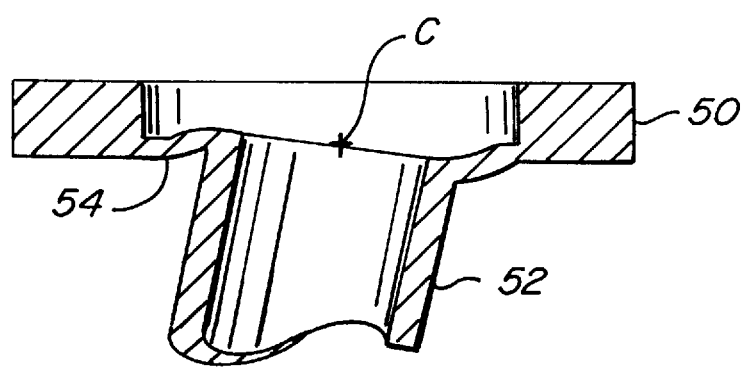
FIG. 5 is a cross sectional view of the hollow pivot assembly of FIG. 4 in a deformed position.

As shown in the exaggerated illustration of FIG. 5, the flexible material deforms in such a manner as to allow the neck portion 52 to pivot about the center point C. In actual operation, however, the flexible material only slightly deforms. Because the flexible material only needs to deform slightly, the flexible material is preferably rigid enough to support the neck portion 52 against unintentional movement in the Z or vertical direction. By preventing vertical movement of the neck portion 52, undesirable vertical vibrations of the scanning assembly 14 during scanning are substantially reduced.

Figure 7:
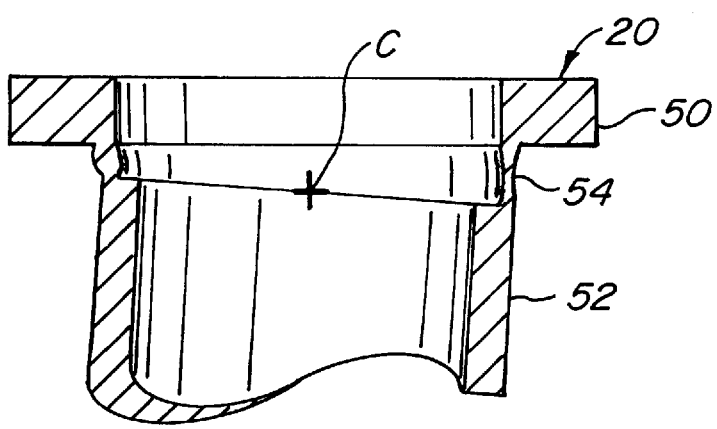
FIG. 7 is a cross sectional view of the hollow pivot assembly of FIG. 6 in a deformed position.

To ensure that the center point C remains stationary during pivoting of the neck portion 52, it is desirable that the forces present in the flexible material and supporting the neck portion are equal and opposite. As shown in FIGS. 5 and 7, the equal and opposite forces allow one side of the neck portion 52 to project towards the mounting portion 50 while a diametrically opposed side of the neck portion projects away from the mounting portion in an equal amount. This pivoting of the neck portion 52 is desirable because it allows the center point C to remain stationary. The stationary center point C allows the scanner assembly 14 to pivot concentric to the arc A extending through the photodetector 48. As a result, the light beam reflected by the cantilever arm 42 remains focused on the photodetector 48 at all times.

Figure 6:
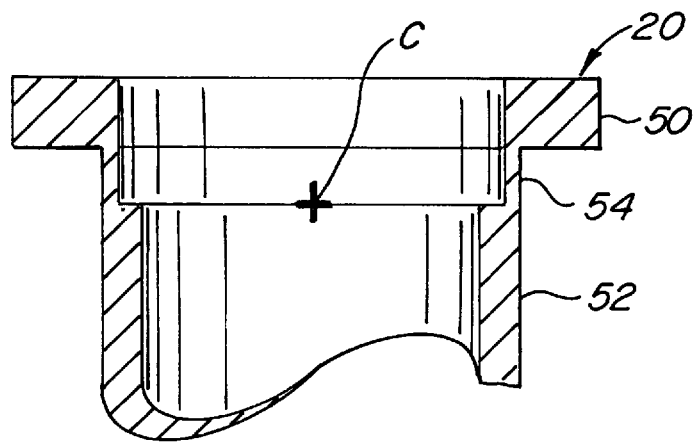
FIG. 6 is a cross sectional view of another alternative form of the hollow pivot assembly.
Figure 8:
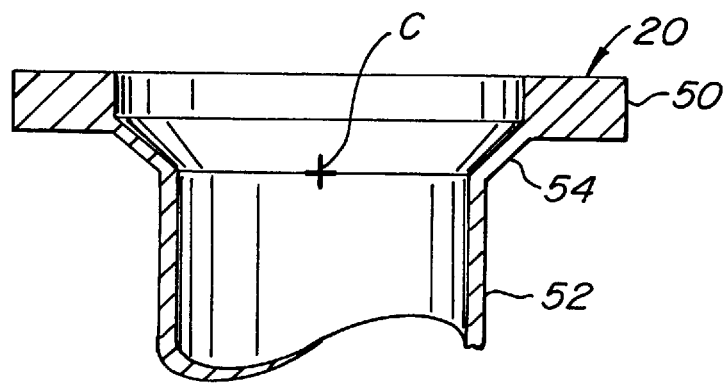
FIG. 8 is a cross sectional view of another alternative form of the hollow pivot assembly.

Two alternative forms of the hollow pivot assembly 20 are shown in FIGS. 6 through 8. In FIGS. 6 and 7, the flexible diaphragm 54 extends longitudinally from the neck portion 52. As the neck portion 52 pivots, part of the flexible material compresses while a diametrically opposed part of the flexible material expands. In the alternative form shown in FIG. 8, the flexible diaphragm 54 extends at an angle from the neck portion 52. As described above, the flexible material of these alternative forms may also be shaped to define holes 56 or tabs 58 extending between the neck portion 52 and the mounting portion 50. These holes 56 or tabs 58 are also preferably symmetrically spaced about the flexible diaphragm so that the force needed to deform the diaphragm 54 is equal about all sides of the neck portion 52.

The neck portion 52, the mounting portion 50, and flexible material connecting these portions together can be integrally formed together as a single unit. In the alternative form illustrated in FIGS. 6 and 7, the flexible material forming the diaphragm 54 may simply comprise a thinned region on the neck portion 52 which allows the neck portion to pivot as described. Preferably, the neck portion 52, the mounting portion 50, and the flexible material are formed of integral steel.

Figure 9:
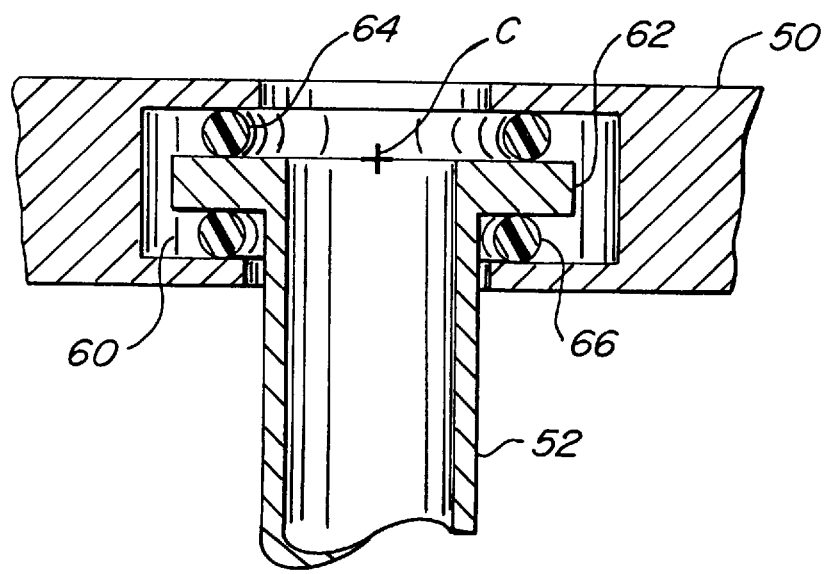
FIG. 9 is a cross sectional view of another alternative form of the hollow pivot assembly.

FIG. 9 illustrates another alternative form of the hollow pivot assembly 20. In this form of the invention 10, the mounting portion 50 is shaped to define a cavity 60 extending into communication with the mounting portion bore. Either a series of projections or a ring 62 extends from the neck portion 52 and into the cavity 60. A first resilient member 64 extends between an upper interior of the cavity 60 and the ring 62, and a second resilient member 66 extends between a lower interior of the cavity and the ring. Preferably, the resilient members 64, 66 each comprise an O-ring which is pre-loaded or compressed into the space between the ring 62 and the cavity 60. As the neck portion 52 pivots, each of the O-rings 64, 66 either compresses or expands to allow the neck portion to pivot about the center point C.

Figure 10:
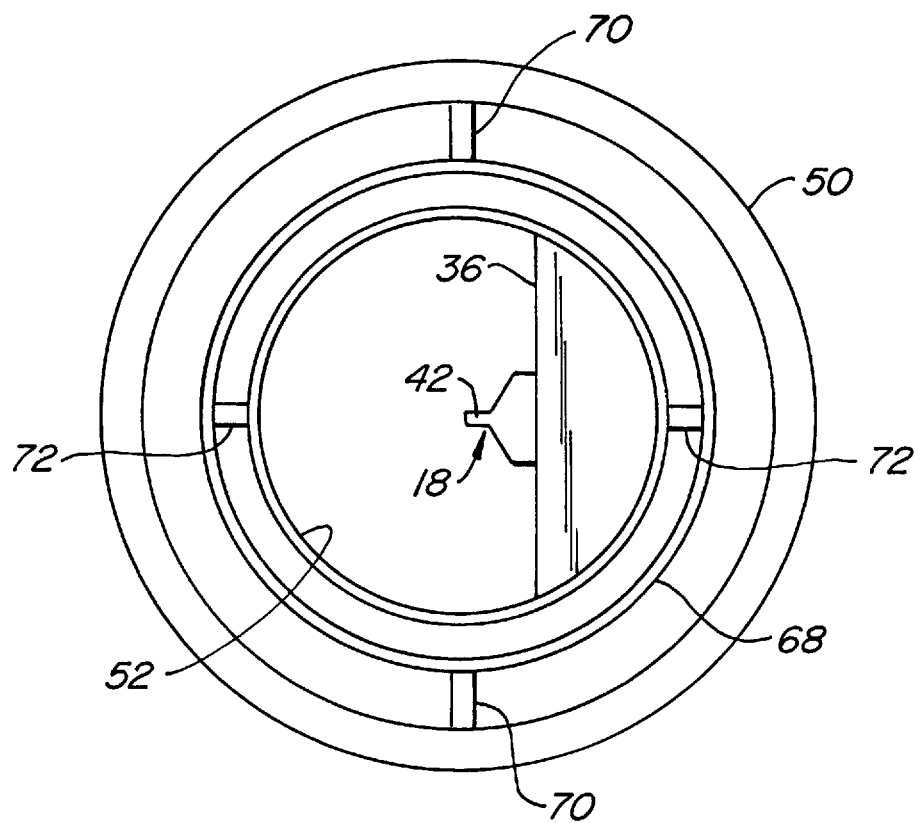
FIG. 10 is a top plan view of another alternative form of the hollow pivot assembly.
Figure 11:
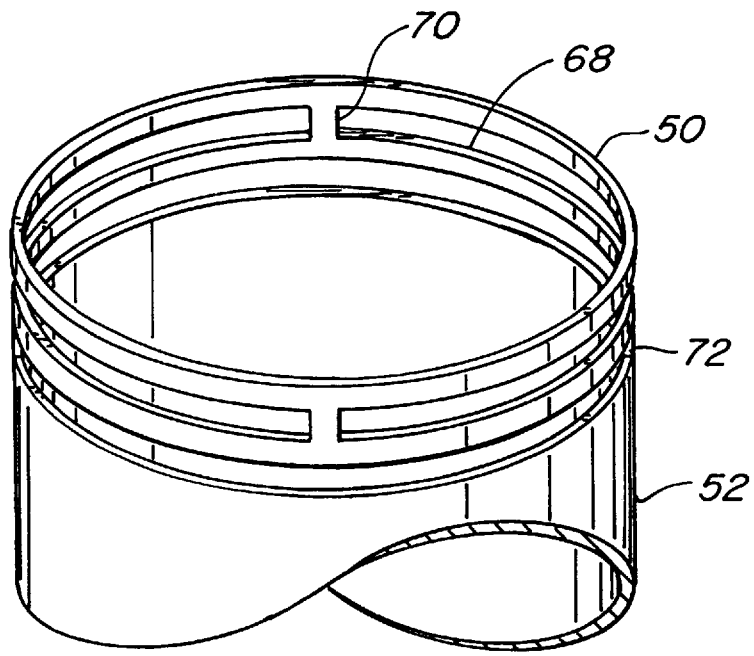
FIG. 11 is an isometric illustration of another alternative form of the hollow pivot assembly.
Figure 12:
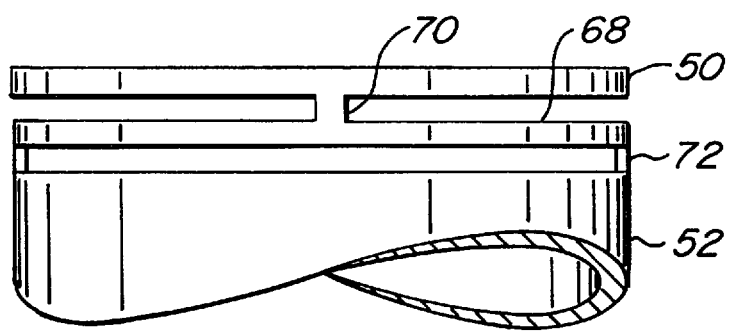
FIG. 12 is a front elevational view of the alternative form of the hollow pivot assembly shown in FIG. 11.

FIGS. 10 through 12 illustrate two more alternative forms of the hollow pivot assembly 20. In these forms of the invention 10, an intermediate portion 68 resides between the neck portion 52 and the mounting portion 50. A first set of axles or tabs 70 extends between diametrically opposed sides of the mounting portion 50 and the intermediate portion 68. Similarly, a second set of axles or tabs 72 extends between diametrically opposed sides of the neck portion 52 and the intermediate portion 68. The first set of tabs 70 is preferably offset by ninety degrees relative to the second set of tabs 72. As shown in FIG. 10, the tabs 70, 72 can extend perpendicularly between the neck portion 52, the intermediate portion 68, and the mounting portion 50. Alternatively, the tabs 70, 72 can extend longitudinally relative to the neck portion 52, as shown in FIGS. 11 and 12. It is preferable, however, that the tabs 70, 72 reside within a common plane, as shown in FIG. 10, so that the center point C remains stationary during pivoting of the neck portion 52 in either direction.

In use, the hollow pivot assembly 20 allows the scanning assembly 14 to pivot about the stationary center pivot C. Because the hollow pivot assembly 20 mounts the scanning assembly 14 to the support structure 12, an individual can view the cantilever arm 42 of the sensor assembly 18 from directly overhead through the upper scanner body bore. This viewing capability substantially reduces the possibility that the probe tip will accidentally impact the sample 16 when a user is aligning the sensor assembly 18 with the sample 16. Moreover, this viewing capability allows an individual to optically view the sample 16 from directly overhead with an optical microscope or charge coupled device.

The scanning probe microscope 10 of the present invention is not intended to be limited to the embodiments disclosed herein. The invention 10 may be modified for other types of scanning force microscopy in contact, intermittent-contact, or non-contact modes, scanning tunneling microscopy, electrochemistry atomic force microscopy and scanning thermal microscopy, near-field scanning optical microscopy, scanning thermal microscopy, scanning magnetic force microscopy, scanning electrostatic microscopy, and related techniques. Moreover, the invention may use alternative sensing means which employ other reflecting elements, the piezoelectric effect, the piezoresistive effect, the use of resonating elements, photodiodes, or photoelectric effects.

Accordingly, it is apparent from the foregoing that while particular forms of the invention have been illustrated and described, various modifications can be made without departing from the spirit and scope of the invention. Accordingly, it is not intended that the invention be limited by the foregoing description, but only by the appended claims and their legal equivalents.

What is claimed is:

1. A structure for examining surface contours of a specimen by scanning probe microscopy including scanning force microscopy in contact, intermittent-contact or non-contact modes, scanning tunneling microscopy, electrochemistry AFM and STM, near-field scanning optical microscopy, scanning thermal microscopy, scanning magnetic force microscopy, scanning electrostatic microscopy, and related techniques, comprising:

a main body;

a scanner body pivotally coupled to the main body, the scanner body having a scanner body bore directed therethrough;

a sensing assembly mounted on the scanner body;

wherein the sensing assembly is aligned with and viewable through the scanner body bore.

2. The structure of claim 1, wherein the scanner body pivots relative to the main body about a stationary center point.

3. The structure of claim 1, wherein the scanner body is pivotally mounted to the main body by a hollow pivot assembly extending between the scanner body and the main body.

4. A structure for examining surface contours of a specimen by scanning probe microscopy including scanning force microscopy in contact, intermittent-contact or non-contact modes, scanning tunneling microscopy, electrochemistry AFM and STM, near-field scanning optical microscopy, scanning thermal microscopy, scanning magnetic force microscopy, scanning electrostatic microscopy, and related techniques, comprising:

a main body;

a scanner body having a scanner body bore directed therethrough, wherein the scanner body is pivotally mounted to the main body by a hollow pivot assembly extending between the scanner body and the main body, the hollow pivot assembly comprising:

a mounting portion secured relative to the main body, the mounting portion being shaped to define a mounting portion bore extending through the mounting portion and generally aligned with the scanner body bore;

a neck portion coupled to the scanner body; and a flexible material extending between the neck portion and the mounting portion;

a sensing assembly mounted on the scanner body;

wherein the sensing assembly is aligned with and viewable through the scanner body bore.

5. The structure of claim 4, wherein the flexible material is shaped as a flexible diaphragm extending between the neck portion and the mounting portion.

6. The structure of claim 5, wherein the flexible diaphragm extends substantially perpendicularly from the neck portion.

7. The structure of claim 5, wherein the flexible diaphragm is shaped to define a series of holes extending through and symmetrically spaced about the flexible diaphragm.

8. The structure of claim 5, wherein the flexible diaphragm extends longitudinally from the neck portion.

9. The structure of claim 5, wherein the flexible diaphragm extends at an angle from the neck portion.

10. The structure of claim 4, wherein the flexible material comprises at least one tab extending between the neck portion and the mounting portion.

11. The structure of claim 1, further comprising a lower base positioned beneath the main body; and a plurality of adjustable motor driven supports extending between the main body and the lower base for positioning the main body in relation to the lower base.

12. The structure of claim 1, wherein the scanner body comprises an upper scanner body, a lower scanner body mounted beneath the upper scanner body and supporting the sensing assembly, and a motion driver mounted between the upper scanner body and the lower scanner body.

13. The structure of claim 1, wherein the scanner body comprises an upper scanner body, a lower scanner body mounted beneath the upper scanner body and supporting the sensing assembly; and a piezo driver mounted between the upper scanner body and the lower scanner body.

14. The structure of claim 1, further comprising X-Y motion drivers mounted between the scanner body and the main body.

15. The structure of claim 14, wherein the scanner body pivots relative to the main body about a stationary center point;

wherein the photodetector is mounted at a tangent to the light beam to an arc swept about the stationary center point.

16. The structure of claim 1, further comprising X-Y piezo drivers mounted between the scanner body and the main body.

17. The structure of claim 1, wherein the sensing assembly comprises:

a reflective cantilever arm coupled relative to the scanner body;

a probe tip attached to the free end of the cantilever arm;

a light source mounted relative to the scanner body, the light source producing a light beam directed towards the cantilever arm; and a photodetector mounted relative to the main body.

18. The structure of claim 1, wherein the sensing assembly comprises a reflective cantilever arm coupled to the scanner body; a probe tip attached to a free end of the cantilever arm; a light source mounted relative to the scanner body, the light source producing a light beam directed toward the cantilever arm; and a photodetector mounted on the scanner body.

19. A structure for examining surface contours of a specimen by scanning probe microscopy including scanning force microscopy in contact, intermittent-contact or non-contact modes, scanning tunneling microscopy, electrochemistry AFM and STM, near-field scanning optical microscopy, scanning thermal microscopy, scanning magnetic force microscopy, scanning electrostatic microscopy, and related techniques, comprising:

a main body;

a scanner body having a scanner body bore directed therethrough, wherein the scanner body is pivotally mounted to the main body by a hollow pivot assembly extending between the scanner body and the main body, the hollow pivot assembly comprising:

a mounting portion secured relative to the main body, the mounting portion being shaped to define a mounting portion bore extending through the mounting portion and generally aligned with the scanner body bore, the mounting portion being shaped to define a cavity extending into communication with the mounting portion bore;

a neck portion coupled to the scanner body;

a ring extending from the neck portion and into the cavity;

a first resilient member extending between a upper interior of the cavity and the ring; and a second resilient member extending between a lower interior of the cavity and the ring;

a sensing assembly mounted on the scanner body;

wherein the sensing assembly is aligned with and viewable through the scanner body bore.

20. The structure of claim 19, wherein the resilient members each comprise an O-ring.

21. A structure for examining surface contours of a specimen by scanning probe microscopy including scanning force microscopy in contact, intermittent-contact or non-contact modes, scanning tunneling microscopy, electrochemistry AFM and STM, near-field scanning optical microscopy, scanning thermal microscopy, scanning magnetic force microscopy, scanning electrostatic microscopy, and related techniques, comprising:

a main body;

a scanner body having a scanner body bore directed therethrough, wherein the scanner body is pivotally mounted to the main body by a hollow pivot assembly extending between the scanner body and the main body, the hollow pivot assembly comprising:

a mounting portion secured relative to the main body, the mounting portion being shaped to define a mounting portion bore extending through the mounting portion and generally aligned with the scanner body bore;

a neck portion coupled to the scanner body; and an intermediate portion positioned between the neck portion and the mounting portion;

wherein the neck portion is pivotally coupled to the intermediate portion and the intermediate portion is pivotally coupled to the mounting portion;

a sensing assembly mounted on the scanner body;

wherein the sensing assembly is aligned with and viewable through the scanner body bore.

22. The structure of claim 21, wherein the neck portion is pivotally coupled to the intermediate portion by a first set of tabs extending from diametrically opposed sides of the mounting portion and coupled with the intermediate portion, and the intermediate portion is pivotally coupled to the mounting portion by a second set of tabs extending from diametrically opposed sides of the neck portion and coupled with the intermediate portion.

23. The structure of claim 22, wherein the first set of tabs is offset by ninety degrees relative to the second set of tabs.

24. A method of simultaneously scanning and optically viewing a stationary sample from directly overhead, the method comprising the steps of:
   providing a scanning probe microscope wherein the scanner body is pivotally mounted to the main body by a hollow pivot assembly extending through the scanner body and the main body, comprising a sensing assembly;
   positioning a sample beneath the sensing assembly; and
   viewing the sensing assembly and the sample along an axis directed through the sensing assembly and perpendicularly intersecting the sample.

25. A structure for examining surface contours of a specimen by scanning probe microscopy including scanning force microscopy in contact, intermittent-contact or non-contact modes, scanning tunneling microscopy, electrochemistry AFM and STM, near-field scanning optical microscopy, scanning thermal microscopy, scanning magnetic force microscopy, scanning electrostatic microscopy, and related techniques, comprising:
   a main body positionable over a sample;
   a scanner body pivotally coupled relative to the main body and pivots relative to the main body about a stationary outer point;
   a sensing assembly mounted on the scanner body, the sensing assembly being positionable proximal to the sample;
   wherein the sensing assembly is aligned with and viewable from directly overhead along an axis directed through the sensing assembly and perpendicularly intersecting the sample.

26. The structure of claim 25, wherein the scanner body is pivotally coupled relative to the main body by a hollow pivot assembly extending between the scanner body and the main body.

27. A structure for examining surface contours of a specimen by scanning probe microscopy including scanning force microscopy in contact, intermittent-contact or non-contact modes, scanning tunneling microscope, electrochemistry AFM and STM, near-field scanning optical microscopy, scanning thermal microscopy, scanning magnetic force microscopy, scanning electrostatic microscopy, and related techniques, comprising:
   a main body positionable over a sample;
   a scanner body pivotally coupled relative to the main body by a hollow pivot assembly extending between the scanner body and the main body, the hollow pivot assembly comprising:
      a mounting portion secured relative to the main body, the mounting portion being shaped to define a mounting portion bore extending through the mounting portion;
      a neck portion coupled to the scanner body; and
      a flexible material extending between the neck portion and the mounting portion;
   a sensing assembly mounted on the scanner body, the sensing assembly being positionable proximal to the sample;
   wherein the sensing assembly is aligned with and viewable from directly overhead along an axis directed through the sensing assembly and perpendicularly intersecting the sample.

* * * * *